May 12, 1959  H. J. FELDHAKE  2,885,795
DEVICE FOR PHYSICALLY DEMONSTRATING THE PYTHAGOREAN THEOREM
Filed Sept. 26, 1956
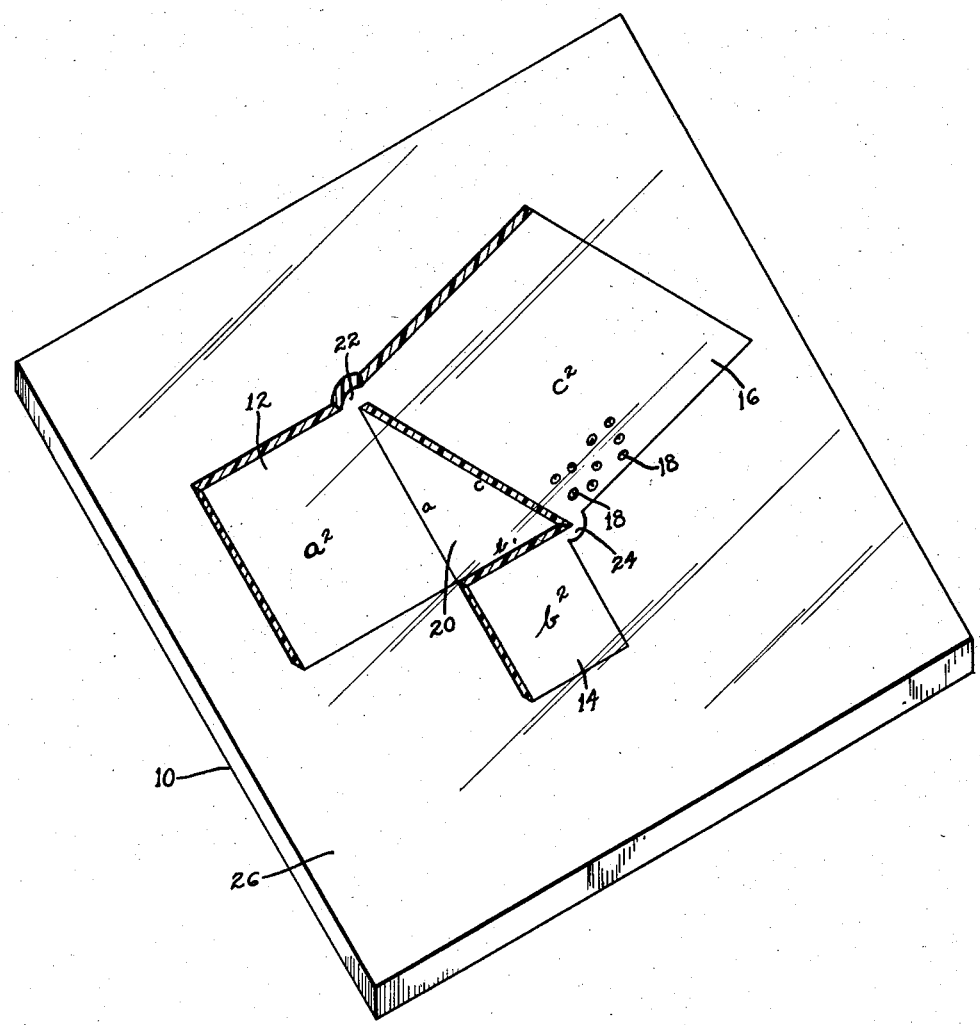
INVENTOR.
HERBERT J. FELDHAKE
BY United States Patent Office 2,885,795
Patented May 12, 1959

2,885,795

DEVICE FOR PHYSICALLY DEMONSTRATING THE PYTHAGOREAN THEOREM

Herbert J. Feldhake, Chicago, Ill.

Application September 26, 1956, Serial No. 612,336

6 Claims. (Cl. 35—34)

(Granted under Title 35, U.S. Code (1952), sec. 266)

The invention described herein may be manufactured and used by or for the Government of the United States of America for governmental purposes without the payment of any royalties thereon or therefor.

This invention relates to a device providing a physically meaningful demonstration of mathematical formulas, particularly formulas containing second and third order terms such as the Pythagorean theorem.

Mathematics is an abstract subject which is generally taught by means of symbols and figures drawn upon a blackboard. It is a well-known fact that many pupils find it difficult to learn by this method, but are aided in their learning by physical demonstrations of the properties of abstract principles and geometrical forms.

The present invention provides a device for demonstrating the physical meaning of mathematical formulas containing terms of the area and volume type (second and third order terms). Terms on one side of the formula are represented by areas or volumes formed in a containing structure preferably fabricated from transparent plastic material. Terms on the other side of the formula are represented by other areas or volumes of simple, easily comprehended, geometrical forms, such as squares, rectangles or cubes, equivalent in total area or volume to the total area or volume, respectively, of the terms on the first side of the formula. The areas or volumes representing the terms on one side of the formula communicate with those on the other side. A freely mobile fluid material, preferably spherical pellets, covers the total area or fills the total volume representing the terms on one side of the formula. Equivalence of both sides of the formula is demonstrated by transferring the fluid to the areas or volumes corresponding to the terms on the other side of the formula.

An object of the invention is to provide a device particularly useful in teaching mathematics.

Another object is to provide a device capable of furnishing a physically meaningful demonstration of a mathematical formula containing second or third order terms.

A further object is to provide a device capable of furnishing a physical demonstration of the Pythagorean theorem.

Still another object is to provide a device which enables students to more quickly and easily understand the meaning of certain mathematical formulas and to remember them for a longer period of time.

Other objects and many of the attendant advantages of this invention will be readily appreciated as the same becomes better understood by reference to the following detailed description when considered in connection with the accompanying drawings wherein:

The figure is a perspective view of an embodiment of the invention.

A board 10, which may have any peripheral shape and preferably is fabricated from plastic material although other materials may be used, contains three excised portions, 12, 14 and 16. These excised portions 12, 14 and 16 do not extend completely through the depth of the board 10 but are sufficiently deep to accommodate spherical pellets or balls 18.

The areas of the excised portions 12, 14 and 16 are squares, each having one side which is also a leg of a right triangle 20 located in the central region of the board 10. The legs of the triangle are designated $a$, $b$ and $c$ in the diagram. Thus, the areas of the respective squares 12, 14 and 16 are $a^2$, $b^2$ and $c^2$.

The squares 12, 14 and 16 communicate with each other by means of passages 22 and 24 which are wide enough to allow at least one pellet 18 to pass through easily.

Sufficient pellets 18 are employed to solidly cover the $c^2$ area 16, although this is not shown on the diagram. The pellets 18 may be marbles, ball bearings, buckshot, or other freely mobile fluid material. A colored liquid might also be employed. If desired, another transparent board may be secured over the top of the first board 10 to prevent loss of the pellets 18 or liquid. In this case, it is necessary that the contiguous surfaces be flat.

The Pythagorean theorem states that, for any right triangle, the square of the hypotenuse is equal to the sum of the squares of the other two sides; or in mathematical symbols, $c^2 = a^2 + b^2$.

To prove the truth of this formula, all the pellets 18 which cover the $c^2$ area 16 are transferred through the passages 22 and 24 to the $a^2$ and $b^2$ areas 12 and 14. This is accomplished by tilting the board 10. It will be found that the pellets 18 now solidly cover the $a^2$ and $b^2$ areas 12 and 14, thus graphically demonstrating that the sum of the $a^2$ and $b^2$ areas 12 and 14 is equal to the $c^2$ area 16.

If the freely mobile material is sand or liquid, the equality of the excised portions may be shown by completely filling the volume of the excised portions from the bottom to the upper surface 26 of the board 10. This, of course, assumes that each of the excised portions, 12, 14 and 16 is cut to the same depth.

For added effectiveness, the symbols $a$, $b$, $c$, $a^2$, $b^2$, and $c^2$ may be painted on the board 10 in the positions indicated in the diagram.

Obviously many modifications and variations of the present invention are possible in the light of the above teachings. It is therefore to be understood that within the scope of the appended claims the invention may be practiced otherwise than as specifically described.

What I claim is:

1. A device for physically demonstrating the Pythagorean theorem comprising; structure formed with three excised sections extending partially therethru, each section being cut out in the form of a square area and each square area having one side which forms a different leg of a right triangular section in the central portion of said structure, said structure also formed with a pair of passages providing communication between the largest of said excised sections and each of the other two excised sections; and freely mobile fluid material in sufficient amount to solidly cover the area of the largest excised section, said passages between said excised sections being of sufficient width to permit transfer of said material between said sections.

2. A device as set forth in claim 1, wherein said structure is fabricated from transparent plastic material.

3. A device as set forth in claim 1, wherein said fluid material comprises spherical pellets.

4. A device for physically demonstrating the Pythagorean theorem comprising; a board formed with three excised sections extending partially through the depth of said board, each section being excised in the form of a square area and each square area having one side which forms a different leg of a right triangular section in the central portion of said board, said board also formed with a pair of passages providing communication between the largest of said excised sections and each of the other two excised sections; and a plurality of freely mobile fluid objects of sufficient number to solidly cover the area of the largest excised section, said passages between said excised sections being of sufficient width to permit transfer of at least one of said fluid objects at a time.

5. A device as set forth in claim 4, wherein said board is fabricated from transparent plastic material.

6. A device for physically demonstrating the Pythagorean theorem comprising; a flat board formed with three excised sections extending partially through the depth of said board, each section being excised in the form of a square area and each square area having one side which forms a different leg of a right triangular section in the central portion of said board, said board also formed with a pair of passages providing communication between the largest of said excised sections and each of the other two excised sections; and a plurality of spherical pellets of sufficient number to solidly cover the area of the largest excised section, said passages between said excised sections being of sufficient width to permit transfer of at least one of said pellets at a time.

References Cited in the file of this patent

UNITED STATES PATENTS

| | | |
|---|---|---|
| 296,018 | Kennedy | Apr. 1, 1884 |
| 357,889 | Badger | Feb. 15, 1887 |
| 502,184 | Gallegos | July 25, 1893 |
| 1,642,236 | Foster | Sept. 13, 1927 |
| 2,502,238 | Wade et al. | Mar. 28, 1950 |
| 2,789,371 | Shanhouse | Apr. 23, 1957 |

FOREIGN PATENTS

| | | |
|---|---|---|
| 22,006 | Great Britain | of 1903 |